Dec. 11, 1956  J. W. JOHNSON  2,773,385
SHORE WAVE RECORDER (SHALLOW WATER)
Filed June 28, 1954  4 Sheets-Sheet 1

INVENTOR.
JOE W. JOHNSON
BY George Sipkin
George E. Pearson
ATTORNEYS

INVENTOR.
JOE W. JOHNSON

Dec. 11, 1956  J. W. JOHNSON  2,773,385
SHORE WAVE RECORDER (SHALLOW WATER)
Filed June 28, 1954.  4 Sheets-Sheet 3

INVENTOR.
JOE W. JOHNSON
BY George Sipkin
George E. Pearson
ATTORNEYS

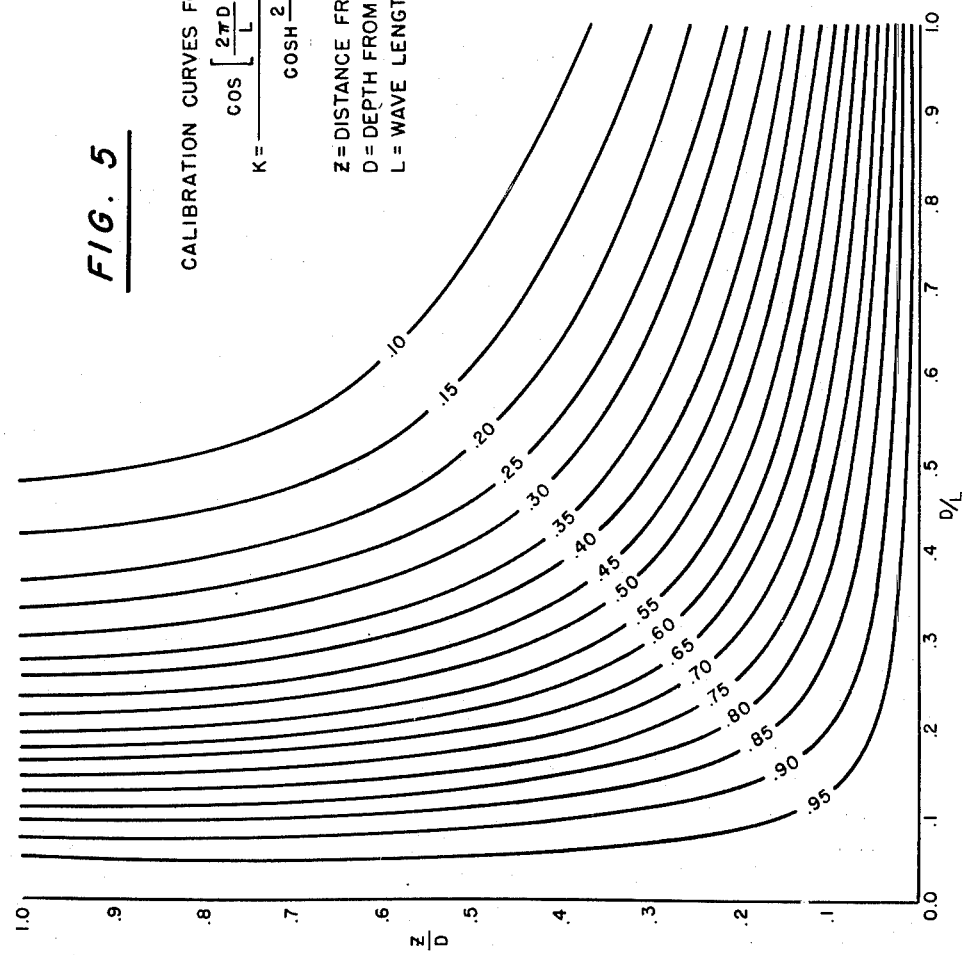

United States Patent Office 2,773,385
Patented Dec. 11, 1956

2,773,385

SHORE WAVE RECORDER (SHALLOW WATER)

Joe W. Johnson, Berkeley, Calif., assignor to the United States of America as represented by the Secretary of the Navy Application June 28, 1954, Serial No. 439,945

3 Claims. (Cl. 73—301)

The present invention relates to a shore wave recorder and more particularly to a remote control wave height recorder employing the principle of transmitting the wave motion into a proportional change in electrical current by using the wave pressure to compress a bellows whose motion can be transmitted, for example, to a coil in a magnetic field, a variable potentiometer, a strain gage, or to a variable reluctance element and whose output from the resulting electrical circuit may be recorded on a strip chart recorder, magnetic tape or photographic recorder.

This invention is useful in obtaining data necessary to the compilation of statistical summaries of wave characteristics at selected points along a coastline. When several years of these records have been assembled and a reliable average condition has been determined, these records will serve as a useful guide for engineers engaged in the planning of coastal and shore protection works. Further, these records will provide adequate data on the characteristics of the waves to be expected for the different seasons at any one point. These records are also useful in making a running comparison with those obtained by the method of forecasting waves from weather charts and to keep a record of the waves arriving at instrument stations.

Various prior art instruments have been used in recording ocean wave pressure fluctuations, among them being a hydrostatic wave recorder of Russian origin utilizing an air pressure chamber connected with a pneumatic-type shore-based recorder by a length, limited from 80 to 100 meters, of 2 centimeters pneumatic hose. The maximum usuable depth is 6 to 8 meters for a wave 2 meters in height. This instrument cannot be used in rough or deep water not far enough from shore to be of value.

Another type of pressure-time recorder heretofore employed is the "Brass Box," consisting of an Esterline-Angus chart drive with a special pressure-actuated pen. Wave frequency differential pressures actuate a pressure element, as in the present invention, but tidal cycles or changes in mean depth are not recorded. Rapid large pressure fluctuations (as in raising or lowering the instrument in the water) cause a pressure differential in excess of the range of the instrument and are equalized by a relief valve which is set to open at differential pressures slightly greater than the range for which it is used. The "slow leak," a three-inch length of small bore tubing, relieves long period tidal pressure changes, thereby to maintain the case pressure at a value corresponding to the mean depth of water over the instrument. Another disadvantage is that the recorder has to be raised periodically to wind the clock drive and change the recording chart. Thus it is not practicable for long-range off-shore installation or in great depths of water.

The Cambridge recorder of British manufacture consists of an underwater pressure pick-up unit and control box without recording mechanism. The electrical output of the pressure pick-up unit is fed into a mirror galvanometer or other sensitive indicating device and recorded with a recording camera. The range of maximum pressure with this equipment is approximately six feet of water and the recorder has to be operated and continuously maintained by trained personnel.

The shore wave recorder of the present invention comprises an underwater pressure pick-up unit and a shore based recording milliammeter of the standard Esterline-Angus graphic instrument type which is connected by means of a one-inch diameter, three-conductor, submarine armored cable of practically unlimited length (50 mile maximum). Floats mark the spot and buoy up a ⅜ inch wire rope which is used to retrieve the underwater unit if recovery is necessary. The recorder provides a pressure record in which the "average" pressure, with which the instant pressure is measured, is continually corrected for tidal changes, and can measure waves up to 20 feet in height. The underwater unit can be installed at depths up to 150 feet, with the deep water model, disclosed in my co-pending application, Serial No. 439,947, filed June 28, 1954, now Patent No. 2,700,306, capable of transmitting accurately from 600 feet of depth. In addition to these obvious advantages over instruments in present use, the recorder of the present invention provides accurate results, is effective and efficient in operation with a minimum of maintenance. The pick-up unit will operate submerged up to two years before overhaul is required. In addition, personnel with limited instruction are able to operate the present instrument.

Within the pick-up unit there is provided a first pressure element responsive to the average sea pressure and a second element responsive to the instantaneous pressure of the surrounding sea water. These are arranged in opposed relation to provide a measure of the difference in pressures.

In operation, two resistances of a Wheatstone bridge circuit are formed by a 750 ohm potentiometer and connected to the shoreward portion of the circuit (the Esterline-Angus recording milliammeter) by means of the three-conductor cable. The relative position of the slide wire on the precision potentiometer is controlled by a cantilever beam, which is subjected to deflection proportional to the difference in the average pressure and the instantaneous pressure due to the passage of a wave and controlled by the resultant movement of the aforementioned pressure elements. This differential type of instrument provides a pressure record that is independent of tides and, at the same time, provides accurate results when placed at great depths.

The long time average pressure exists in an airdome, which is attached to a casing for the pressure unit. By producing impedance or flow resistance of sea water into the airdome, the short period pressure fluctuations due to the waves are filtered out. This impedance is of such magnitude that it takes from 15 to 20 minutes for the pressure to equalize in the airdome after a step function change in the pressure. The impedance elements are felt discs, a material which shows no deterioration when immersed in sea water. Due to the continual movement of water into and out of the airdome, there is a tendency for the water to absorb air (thus changing its density). To prevent this, a thin layer of oil is placed on the water surface inside the dome. The pressure element responsive to this average pressure, in turn, is filled with fresh water; thus, the pressure, due to the passage overhead of waves, is transmitted to this pressure element without a loss of energy. O rings are used to keep sea water out of the pressure unit. A coat of marine varnish is applied to the pressure unit to keep the latter free from marine growth and barnacles.

An object of the present invention is the provision of an instrument to provide on the spot wave data for use in offshore construction, to provide wave information to the marine industries and for the design of coastal structures.

Another object is to provide a wave measuring device which avoids the obscuring effect of small local waves and chop and which records only the effect of the larger waves which dominate the surf.

A further object of the invention is the provision of a wave pressure device in which pressure changes due to tides are filtered out to provide a more accurate measuring of wave height by differential pressure measurement.

Still another object is to provide a wave recording instrument that may be placed some distance from shore, in varying depths of water, that will record wave height up to 20 feet, that does not have to be checked periodically, or maintained by trained personnel.

Other objects and many of the attendant advantages of this invention will be readily appreciated as the same becomes better understood by reference to the following detailed description when considered in connection with the accompanying drawings wherein:

Fig. 5 shows the pressure responsive calibration curves for the constant K when the unit is placed at any depth.

Figure 1:
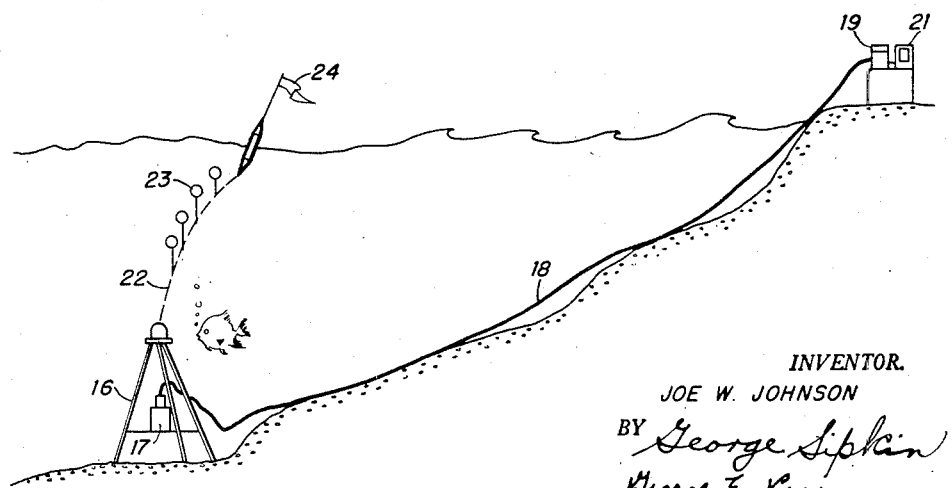
Fig. 1 shows a typical installation layout of an electrical continuous wave recorder in accordance with the present invention.

Referring now to the drawings, wherein like reference characters designate like or corresponding parts throughout the several views, there is shown in Fig. 1 a typical installation layout of the shore wave recorder comprising a frame 16 supporting the underwater pressure pick-up unit 17. A three-conductor armored submarine cable 18 connects the pressure pick-up unit to a short-based bridge and power supply 19 and recording mechanism 21. The buoy and retrieving cable 22 is supported by flotation buoys 23 and marked on the ocean surface by flag buoy 24.

Figure 3:
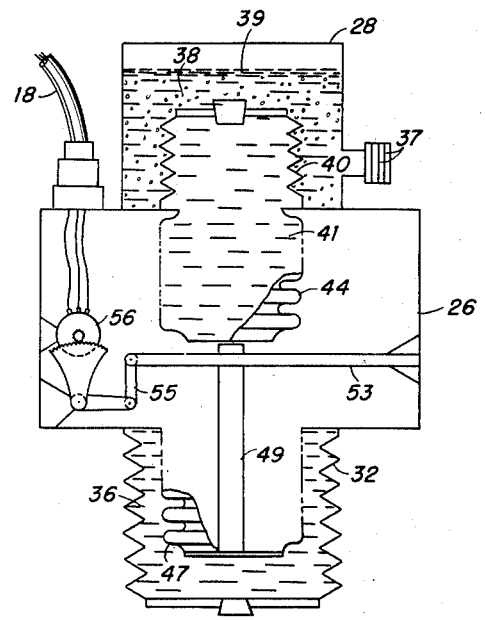
Fig. 3 is a schematic diagram of the underwater pressure pick-up unit.
Figure 2:
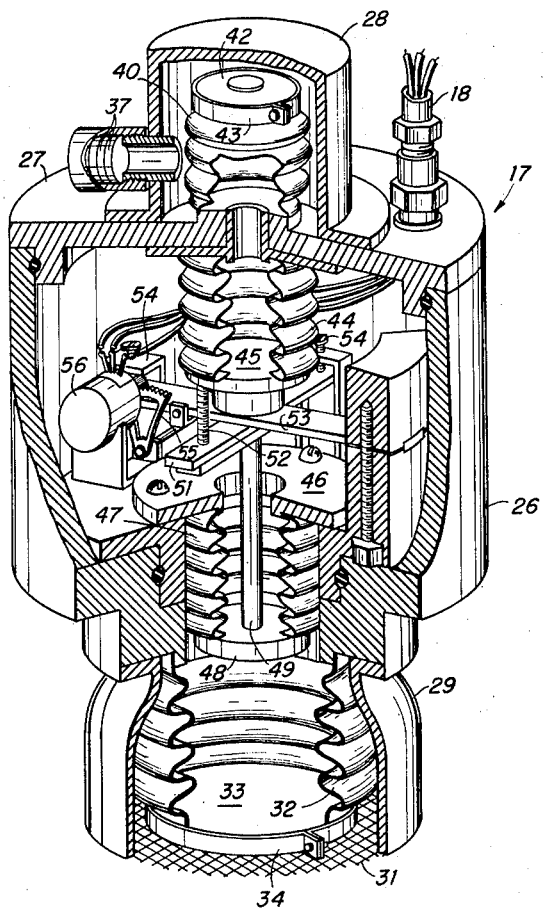
Fig. 2 represents a pictorial view with cut away portions to show inner parts of the shore wave recorder underwater pressure pick-up unit.

Referring now to Figs. 2 and 3, casing 26 is enclosed at the top by cover 27 and top dome 28. Extending downwardly from casing 26 is bottom bellows protector 29 to which is attached a screen 31. A bottom rubber bellows 32 is attached to the bottom of casing 26 within the protector 29. The bottom of the bellows is covered by a cap 33 secured by clamp 34 and filled with fresh water 36. An opening is made in the top dome 28 into which is placed felt disc filters 37 or other suitable material such as sintered glass that will retard the flow of sea water 38 into the dome 28.

By producing impedance or flow resistance, the short period pressure fluctuations due to smaller waves are filtered out. The impedance of the discs 37 is of such magnitude that a long time average pressure exists in the airdome 28. This pressure adjusts itself for tides so that the influence of tides upon the differential pressure is negligible. As sea water filters through the discs 37 to fill dome 28, air is compressed in the top of the dome and is partially absorbed into the continually charging sea water. To reduce this air absorption, oil is placed in the dome to form an oil film 39 between the compressed air and the sea water.

Within dome 28 is an opening in cover 27. This opening is covered with a top rubber bellows 40 filled with fresh water 41 covered by cap 42 secured by clamp 43.

Covering the opening in cover 27 from the inside of the casing is metal bellows 44 capped by plate 45.

Mounted within the opening in the bottom of casing 26 and attached to connecting ring 46 is a second metal bellows 47 with plate 48 to which is attached a connecting rod 49. A cross bar 51 is attached to the top of the rod 49 through which adjusting screws 52 are inserted to provide contact with plate 45.

At one side of the casing 26 is mounted a cantilever beam 53, which contacts both cross bar 51 and plate 45. Limit stops 54 prevents damage due to an excessive sudden pressure on bellows plate 48. The dimensions and material of the beam 53 determine the pressure limits of the unit. The free end of beam 53 is connected through a linkage mechanism 55 to a 750 ohm potentiometer 56.

Potentiometer 56 forms two resistances of a Wheatstone bridge circuit and is connected to the shoreward portion of the circuit by means of the three conductor cable 18. The relative position of the slide wire on the precision potentiometer 56 is controlled by beam 53 which is subjected to a deflection proportional to the difference in the average pressure, as exerted on bellows plate 45, and the instantaneous pressure, as exerted on bellows plate 48, due to the passage of a wave.

It should be understood that rubber bellows 40 and 32, cover 27 and casing 26 as well as the cable connection are so connected and sealed as to prevent leakage of sea water into the air filled interior formed thereby.

Fresh water may be placed inside the rubber bellows 32 and 40 through any suitable watertight opening in plates 42 and 33 and the rubber bellows, fresh water and metal bellows combination operates as a rigid unit in order that there be no loss of energy when transmitting the pressure, due to the passage of waves, into the pressure elements 44 and 47.

The shore recording unit consisting of two bridge elements connected across power supply unit 19 and recorder 21 completes the invention. The two bridge elements are connected to the two ends of the potentiometer and the recorder connected to the slide wire of the potentiometer and the junction of the two shore-based bridge elements. The potentiometer in the underwater pressure pick-up unit thus forms two sides of a Wheatstone bridge and is connected to the shoreward bridge elements of the circuit by the three conductor cable 18. Since the bridge circuit operates on D. C. voltage, a rectifier and a voltage regulator are incorporated in a common unit with the bridge in order that A. C. or D. C. voltage may be used.

The pressure versus depth relationship is such that the additional pressure caused by the passage of an ocean wave decreases with the distance below the water surface and becomes nearly negligible for most purposes at a depth equal to or greater than one half the length of the wave. Thus when an instrument of this type is placed at a depth of 600 feet, it would mean that all waves 1200 feet or less in length will be filtered out hydrodynamically. Since the length of a wave is a direct function of its period, $$L_0 = g/2\pi T^2$$

where $L_0$ = wave length in feet
$g$ = acceleration of gravity
$T$ = wave period in seconds all waves with periods of less than 15 seconds will not be noticeable on the record. Similarly, when an instrument is placed at a depth of 75 feet, all waves with periods of 5 seconds or less will not be recorded.

The above description applies for underwater pressure pick-up units designed to be installed at a depth of not greater than 150 feet. With certain modifications a pick-up unit has been designed for underwater installation up to 600 feet. Among these modifications are special provisions such as a helium filled reservoir, time-release valves, and an emergency pop-off valve to accompany the unit for installation as well as basic changes in the structure of the unit. This is the subject matter of my co-pending application, Serial No. 439,947, filed June 28, 1954, now Patent No. 2,700,306.

*Theoretical treatment for the pressure fluctuations at a given depth*

The shore wave recorder works on the principle of recording pressure fluctuations at the sea bottom and transposing these valves to surface wave heights. In order to express the maximum pressure differences as surface wave heights, the relationship of these values with respect to the pertinent variables must be determined.

The theoretical treatment for the pressure depth relationship considers the two dimensional, irrotational motion of an incompressible fluid in a relatively deep channel of constant depth. The fluid motion is assumed to be generated from rest by the action of normal forces; thus, a velocity potential ($\phi$) exists and will satisfy the La Place equation $$\frac{\partial^2 \phi}{\partial x^2}+\frac{\partial^2 \phi}{\partial Z^2}=0$$

For two dimensional flow, Euler's equation may be reduced to $$\frac{P}{\rho}=\frac{\partial \phi}{\partial t}+gZ-\frac{1}{2}\left[\left(\frac{\partial \phi}{\partial x}\right)^2+\left(\frac{\partial \phi}{\partial Z}\right)^2\right]$$

where Z is the vertical dimension measured positive in the downward direction, P is the pressure at a given depth, and $\rho$ is the density of water. Progressive waves in a long channel with constant width and depth are assumed to be a simple harmonic function of the distance $x$ along the surface.

A velocity potential with suitable boundary conditions may be defined as $$\phi=\frac{ga}{\sigma}\frac{\cosh k(D-Z)}{\cosh kD}\cos(kx-\sigma t)$$

where $k=2\pi/L$
$\sigma=2\pi/T$
$D$=depth of water
$L$=wave length
$a$=a function of wave height, usually equal to one half the height
$g$=acceleration of gravity
$t$=time
$T$=wave period
$C=L/T=\sigma/k$=wave velocity $$L_0=\frac{g}{2\pi}T^2=5.12T^2$$

$$\frac{\partial \phi}{\partial x}=-\frac{gak}{\sigma}\frac{\cosh k(D-Z)}{\cosh kD}\sin(kx-\sigma t)$$

$$\frac{\partial \phi}{\partial Z}=-\frac{gak}{\sigma}\frac{\sinh k(D-Z)}{\cosh kD}\cos(kx-\sigma t)$$

$$\frac{\partial \phi}{\partial t}=ag\frac{\cosh k(D-Z)}{\cosh kD}\sin(kx-\sigma t)$$

For the cases where $$\frac{1}{2}\left[\left(\frac{\partial \phi}{\partial x}\right)^2+\left(\frac{\partial \phi}{\partial Z}\right)^2\right]\ll 1$$

substituting the value of $\phi_t$ into the basic pressure equation yields $$P=\rho gZ+\rho ga\frac{\cosh k(D-Z)}{\cosh kD}\sin(kx-\sigma t)$$

at the surface where $Z=0$, the pressure $P_0$ is $$P_0=\rho ga \sin(kx-\sigma t)$$

The wave recorder is a differential pressure device which indicates the change from the average hydrostatic pressure; that is, it records $$\Delta P=P-\rho gZ$$

or $$\Delta P=\rho ga\frac{\cosh k(D-Z)}{\cosh kD}\sin(kx-\sigma t)$$

Then the amplitude of the pressure fluctuation $\Delta P$ at a depth of Z expressed as a ratio to the amplitude of the corresponding surface pressure fluctuation $\Delta P_0$ is $$\frac{\Delta P}{\Delta P_0}=\frac{\cosh k(D-Z)}{\cosh kD}=\frac{\cosh \frac{2\pi D}{L}\left(1-\frac{Z}{D}\right)}{\cosh \frac{2\pi D}{L}}$$

Let H be the height of a wave at the surface, and H' the corresponding equivalent height due to the pressure variations at a depth Z. The relationship between H and H' is defined as $$H=\frac{H'}{K}$$

where K is the pressure response factor.

As the pressures are approximately proportional to the heights of water, observing that the compressibility of water is negligible for the depths to be considered, then $$K=\frac{H'}{H}\frac{\cosh \frac{2\pi D}{L}\left(1-\frac{Z}{D}\right)}{\cosh \frac{2\pi D}{L}}$$

Since a wave recorder usually is placed on the bottom of the ocean, where $Z=D$, then the sub-surface pressure response equation would reduce to $$K=\frac{\Delta P}{\Delta P_0}=\frac{1}{\cosh \frac{2\pi D}{L}}$$

From the above equation it can be seen that for a particular depth of water, the amplitude of fluctuation depends on the wave period because $$\cosh \frac{2\pi D}{L}$$

is a known function of $D/L_0$ with $L_0$ being the deep water wave length, $$L_0=\frac{g}{2\pi}T^2$$

Figure 4:
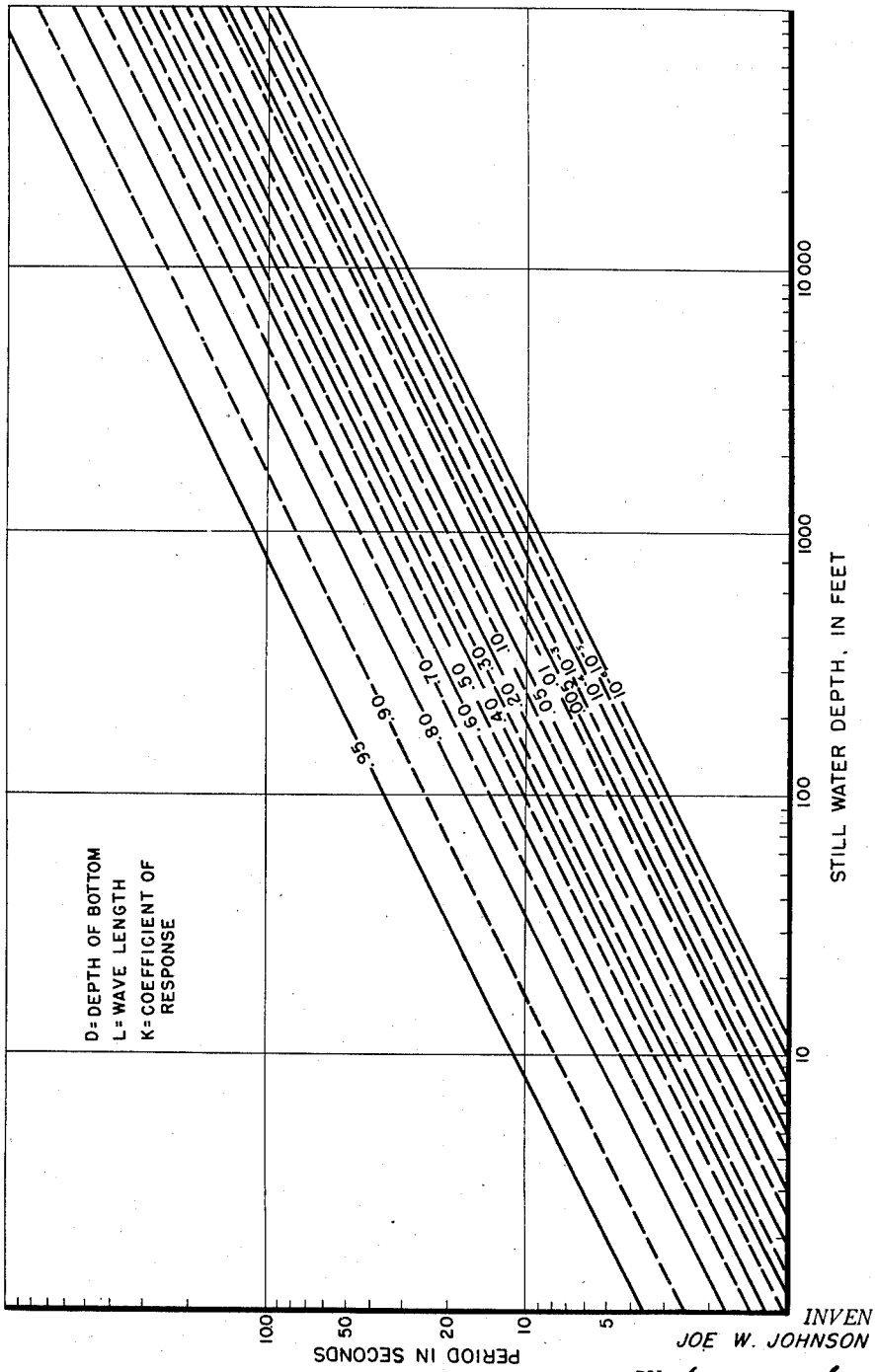
Fig. 4 is a graph showing the pressure responsive factor as a function of water depth and wave period when the pickup unit is located on the bottom of the ocean.

Figure 4 gives the pressure response factor as a function of water depth and wave period when the instrument is located on the bottom of the ocean. Figure 5 shows the pressure response curves for the instrument to be placed at any depth.

Obviously many modifications and variations of the present invention are possible in the light of the above teachings. It is therefore to be understood that within the scope of the appended claims the invention may be practiced otherwise than as specifically described.

What is claimed is:

1. In pressure measuring apparatus for measuring pressure changes due to the overhead passage of large waves and low swells from points below the surface of the water, underwater means responsive to the average sea water pressure around said means, underwater means responsive to an instantaneous sea water pressure, differential pressure responsive means disposed between and in simultaneous engagement with each of said means and directly movable in response to the differential pressure between both said means, and combined shore-based and underwater measuring means having an underwater portion connected to said differential pressure responsive means and a shore-based portion connected to said underwater portion for measuring said differential pressure.

2. In pressure measuring apparatus for measuring pressure changes due to the overhead passage of large waves and low swells from points below the surface of the water, underwater means responsive to the average sea water pressure around said means, underwater means responsive to an instantaneous sea water pressure, differential pressure responsive means connected to both said means and directly movable in response to the differential pressure between both said means, and combined shore-based and underwater measuring means having an underwater portion connected to said differential pressure responsive means and a shore-based portion connected to said underwater portion for measuring said differential pressure, said underwater means responsive to the average sea pressure comprising a housing, a bellows mounted in said housing, a non-corrosive bellows mounted over said first named bellows and in communication therewith, a quantity of fresh water filling the combined volume enclosed by said bellows, a closed container having a filter covered opening therein to admit sea water of average pressure, said non-corrosive bellows being disposed in said container and exposed to sea water of average pressure therein, said sea water being of an average sea water pressure around said non-corrosive bellows and including the pressure due to tides.

3. In pressure measuring apparatus for measuring pressure changes due to the overhead passage of large waves and low swells from points below the surface of the water, underwater means responsive to the average sea water pressure around said means, underwater means responsive to an instantaneous sea water pressure, differential pressure responsive means connected to both said means and directly movable in response to the differential pressure between both said means, and combined shore-based and underwater measuring means having an underwater portion connected to said differential pressure responsive means and a shore-based portion connected to said underwater portion for measuring said differential pressure, said means responsive to the differential pressure comprising a cantilever beam fixed at one end, instantaneous and average sea pressure applied in opposed relation to said beam intermediate the ends thereof, a potentiometer having a wire slideable with respect thereto, the movable end of said beam being mechanically connected to said sliding wire for actuation thereof, said potentiometer forming the underwater portion of said measuring means and being electrically connected to the shore-based portion of said measuring means.

References Cited in the file of this patent

UNITED STATES PATENTS

| | | |
|---|---|---|
| 1,255,034 | Mason | Jan. 29, 1918 |
| 2,541,576 | Detuno | Feb. 13, 1951 |
| 2,592,159 | Klebba | Apr. 8, 1952 |
| 2,637,999 | Klebba | May 12, 1953 |